United States Patent [19]

Bovóne

[11] Patent Number: 4,667,419
[45] Date of Patent: May 26, 1987

[54] DEVICE FOR AUTOMATICALLY ADJUSTING TO THE GLASS SHEET THICKNESS IN THE PRODUCTION OF MIRRORS, DOUBLE GLAZING AND STRATIFIED GLASS

[76] Inventor: Vittorio Bovóne, Via Piave, 21-15076 Ovada (Alessandria), Italy

[21] Appl. No.: 795,531

[22] Filed: Nov. 6, 1985

[30] Foreign Application Priority Data

Nov. 20, 1984 [IT] Italy ............................ 23839/84[U]

[51] Int. Cl.[4] .............................................. F26B 15/00
[52] U.S. Cl. ...................................... 34/148; 34/229; 34/236; 15/77; 15/306 B
[58] Field of Search ........................ 34/69, 71, 95, 148, 34/229, 236, 243 C; 15/77, 306 A, 306 B; 198/624, 627, 628

[56] References Cited

U.S. PATENT DOCUMENTS 4,044,420  8/1977  Hanson ............................ 15/306 B
4,472,889  9/1984  Hanna ................................. 34/229
4,493,123  1/1985  Idstein ..................................... 15/4

Primary Examiner—Albert J. Makay
Assistant Examiner—David W. Westphal
Attorney, Agent, or Firm—Steinberg & Raskin

[57] ABSTRACT

A device for adjusting implements, such as blowing heads, rotary brushes and the like, to the glass sheet thickness in the continuous production of mirrors, where said sheets travel on a conveyor; the implements are mounted on a frame comprising rollers, cylinders and the like, which is suspended from articulated parallelograms and is at least partly counterweighted.

16 Claims, 3 Drawing Figures

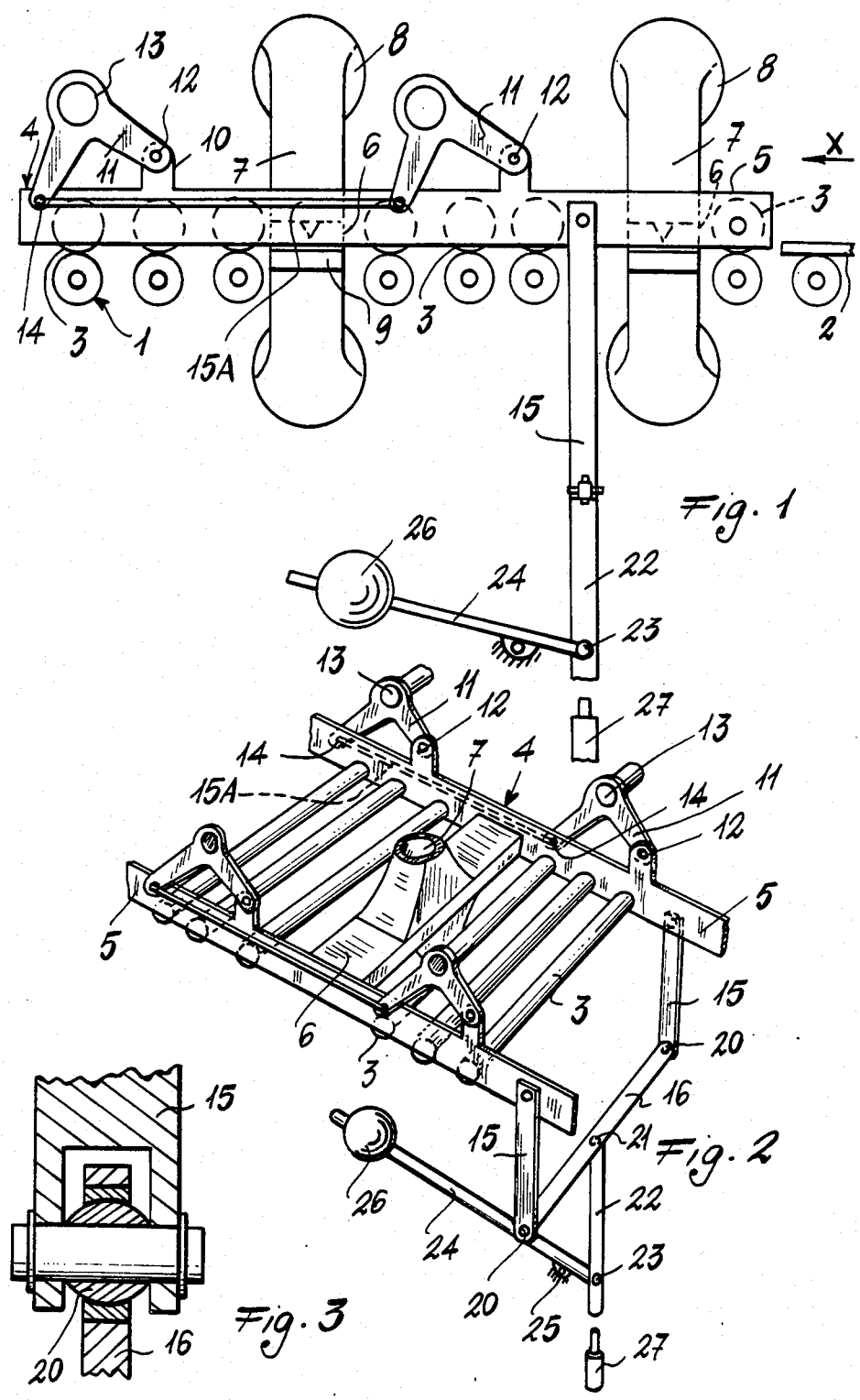

4,667,419

DEVICE FOR AUTOMATICALLY ADJUSTING TO THE GLASS SHEET THICKNESS IN THE PRODUCTION OF MIRRORS, DOUBLE GLAZING AND STRATIFIED GLASS

BACKGROUND OF THE INVENTION

This invention relates to a device for adjusting implements, blowing heads and the like to the glass sheet thickness in the continuous production of mirrors, double glazing and stratified glass.

In mirror production, the glass sheet has to undergo cleaning and drying operations before the metal and protective paint layers are deposited on it to transform it into a mirror. These operations use for example brushes and blowing heads (hereinafter known as "implements") which have to be adjusted to the various sheet thicknesses by uncomfortable and relatively lengthy manual adjustments.

SUMMARY OF THE INVENTION

The object of the present invention is to provide a device which allows comfortable and rapid automatic adjustment of such implements to the thickness of the glass sheets treated.

This and further objects which will be more apparent from the detailed description given hereinafter are attained by a device characterized in that the implements are mounted on a frame comprising rollers, cylinders or the like, which is suspended from articulated parallelograms and is at least partly counterweighted.

BRIEF DESCRIPTION OF THE DRAWINGS

The invention will be more apparent from the detailed description given by way of example hereinafter with reference to the accompanying drawing, in which:

FIG. 1 is a diagrammatic side view of the device of the invention carrying implements which in this case are represented by the blowing heads for drying the glass sheets;

FIG. 2 is a perspective diagrammatic view of the device of FIG. 1;

FIG. 3 is a detailed section through a joint for the counterweighting lever system.

DETAILED DESCRIPTION OF THE PREFERRED EMBODIMENT

In the figures, the reference numeral 1 indicates a conventional roller conveyor along which the sheets 2 to be transformed into mirrors advance. In moving in the direction of the arrow X, the sheets encounter a first motorized upper roller or cylinder 3 and then a series of similar rollers, also indicated by 3, mounted in a frame 4 provided with two parallel side walls 5 which support said motorized rollers. Beteween its side walls and frame also supports the blowing heads 6 which by way of conduits 7 are fed by fans which can also be mounted on the frame 4 or can be connected to said conduits 7 by flexible connectors 8 which enable the heads to undergo movement relative to the fan, which in this case is fixed. If rotary brushes are provided instead of the heads, their drive motor and thus the brushes themselves will be supported by the frame 4.

In the illustrated example, stationary blowing heads 9 are provided in front of the blowing heads 6 for simultaneously drying the two opposing faces of the glass sheets.

Each side wall 5 comprises a pair of lugs 10. The end of a bell crank lever 11 is hinged (at 12) to each lug. This lever rotates about an intermediate stationary pivot 13. The other end of the lever is hinged at 14 to a rod 15A which is common to two levers situated on one and the same side of the frame 4. In this manner, an articulated parallelogram is formed on each side of the frame. The purpose of these parallelograms is to produce a parallel movement of the frame when the sheet 2 encounters the front roller 3 and becomes interposed between the frame rollers and the rollers of the conveyor 1.

The upper end of a bar 15 is hinged to each of the two side walls 5. The two bars 15 are connected together lowerly by a cross-member 16 by way of partial ball joints 20 of the type shown in FIG. 3, so as to allow limited relative angular movements between the bars and cross-member.

A bar 22 is connected to the cross-member in an intermediate position by means of a joint 21 (analogous to the joint 20). This latter bar is connected by an analogous joint 23 to the end of a lever 24, which is pivoted at 25 and carries at its other end a weight 26 which can be adjusted along the lever.

An actuator 27 (represented by a pressurized fluid cylinder-piston unit) can act on the lower end of the bar 22 to act as a stop or to enable the weight 26 to be replaced.

By virtue of the described arrangement, and in particular of the counterweighting provided by the arrangement, the frame 4 together with all the members supported by it can be easily raised by the actual arriving glass sheets whatever their thickness, without the need for adjustment by the operator, notwithstanding the considerable weight of the assembly formed by the frame and the members which it carries.

What is claimed is:

1. Apparatus for adjusting implements for treating a glass sheet, comprising a frame including a pair of elongate, substantially parallel frame sidewalls spaced from each other, and members interconnecting said frame sidewalls to each other, said implements being mounted on said interconnecting members, each of said frame sidewalls constituting one side of an articulated linkage, said linkage further including a pair of opposed levers, and a rod engaged with said opposed levers, each of said levers being pivotally mounted and pivoted to said frame sidewall and rod, said linkage being mounted such that said frame sidewall is movable to mutually parallel positions and such that each frame side wall and each pair opposed levers form three sides of a parallelogram in the mutually parallel positions, conveyor means for moving the sheet along a path substantially parallel to and below a plane containing said frame such that the sheet contacts said frame members, and means for applying a counterweight force to said frame in an upward direction to substantially counteract the weight of said frame, whereby said frame including said pair of sidewalls is movable to mutually parallel positions on one side of said path which are substantially parallel to said path of conveyance and spaced at different distances therefrom, so that said frame, together with all members and implements supported thereby, can be easily raised by an arriving glass sheet of any thickness.

2. The apparatus of claim 1, wherein said levers are each mounted about a stationary pivot point for pivoting with respect thereto.

3. The apparatus of claim 2, wherein said levers are each in the form of a bell crank having two arms joined at an apex thereof,
   with each said lever being mounted about said respective pivot point at said apex thereof, being pivoted to said frame sidewall at one arm thereof, and being pivoted to said rod at said other arm thereof.

4. The apparatus of claim 1, wherein said counterweight applying means comprise
   a counterweight linkage engaged with said frame, and
   a weight mounted upon said counterweight linkage.

5. The apparatus of claim 4, wherein position of said weight along said counterweight linkage is adjustable.

6. The apparatus of claim 4, wherein said counterweight linkage comprises
   a pair of bars, each bar pivoted to a respective frame sidewall,
   a cross member interconnecting said bars so as to allow limited relative angular movement between said bars and cross member, and
   a weight-supporting member coupled to said cross member and supporting said weight.

7. The apparatus of claim 6, wherein said weight-supporting member is a lever pivotally mounted upon a fulcrum, with said weight being adjustable along said weight-supporting lever.

8. The apparatus of claim 6, wherein said counterweight linkage additionally comprises a pair of partial ball joints, with said cross member connected to a respective bar through one of said ball joints.

9. The apparatus of claim 7, wherein said counterweight linkage additionally comprises a third bar connected to said cross member substantially at a midpoint of said cross member so as to allow limited relative angular movement between said third bar and cross member, and
   said weight-supporting lever is connected to said third bar so as to allow limited relative angular movement between said third bar and said weight-supporting lever.

10. The apparatus of claim 9, wherein said counterweight linkage additionally comprises
    a pair of partial ball joints,
    with said third bar connected to said cross-member through one of said ball joints, and
    said weight-supporting lever connected to said third bar through the other of said pair of ball joints.

11. The apparatus of claim 9, additionally comprising
    stop means for stopping movement of said third bar, said stop means connected with said third bar at a point below a point where said weight-supporting lever is connected to said third bar.

12. The apparatus of claim 11, wherein said stop means are constituted by a pressurized fluid piston-cylinder unit coupled to a lower end of said third bar.

13. The apparatus of claim 1, wherein said counterweight applying means comprise
    a counterweight linkage engaged with said frame, and
    means for actuating movement of said counterweight linkage, whereby said counterweight force is applied to said frame.

14. The apparatus of claim 13, wherein said actuating means also constitute means for arresting movement of said counterweight linkage beyond a certain point.

15. The apparatus of claim 13, wherein said counterweight linkage comprises
    a pair of bars, each bar pivoted to a respective frame sidewall,
    a cross member interconnecting said bar so as to allow limited relative angular movement between said bars and cross-member,
    a third bar connected to said cross-member substantially at a midpoint of said cross-member, so as to allow limited relative angular movement between said third bar and cross member,
    with said actuating means to act upon a lower end of said third bar.

16. The apparatus of claim 15, wherein said actuating means are constituted by a pressurized fluid piston-cylinder unit coupled to the lower end of said third bar.

* * * * *